United States Patent
Sanz

(10) Patent No.: US 11,624,006 B2
(45) Date of Patent: Apr. 11, 2023

(54) PHTHALATE-FREE PLASTICIZED ADHESIVE SEALANT COMPOSITION

(71) Applicant: BOSTIK SA, Colombes (FR)

(72) Inventor: Federico Sanz, Choisy Au Bac (FR)

(73) Assignee: BOSTIK SA, Colombes (FR)

( * ) Notice: Subject to any disclaimer, the term of this patent is extended or adjusted under 35 U.S.C. 154(b) by 711 days.

(21) Appl. No.: 16/493,822

(22) PCT Filed: Mar. 13, 2018

(86) PCT No.: PCT/FR2018/050585
§ 371 (c)(1),
(2) Date: Sep. 13, 2019

(87) PCT Pub. No.: WO2018/172652
PCT Pub. Date: Sep. 27, 2018

(65) Prior Publication Data
US 2020/0071574 A1    Mar. 5, 2020

(30) Foreign Application Priority Data
Mar. 14, 2017   (FR) ........................ 1752055

(51) Int. Cl.
*C09J 11/06*    (2006.01)
*C09J 11/04*    (2006.01)
*C09J 175/04*   (2006.01)

(52) U.S. Cl.
CPC ............. *C09J 11/06* (2013.01); *C09J 11/04* (2013.01); *C09J 175/04* (2013.01)

(58) Field of Classification Search
CPC .......... C08G 18/12; C08G 18/4812; C08G 18/7621; C08K 5/0016; C08K 5/103; C09D 5/34; C09J 11/04; C09J 11/06; C09J 175/04; C09J 175/08; C09J 183/04
See application file for complete search history.

(56) References Cited

U.S. PATENT DOCUMENTS

| | | | |
|---|---|---|---|
| 3,925,331 A * | 12/1975 | Ely ................. | C09K 3/1012 528/25 |
| 6,525,159 B1 | 2/2003 | Okuhira et al. | |
| 6,548,593 B2 | 4/2003 | Merz et al. | |
| 6,756,466 B2 | 6/2004 | Okuhira et al. | |
| 6,936,676 B2 | 8/2005 | Okuhira et al. | |
| 10,351,690 B2 | 7/2019 | Bardin et al. | |
| 11,261,352 B2 * | 3/2022 | Sanz ................. | C08G 18/7621 |
| 2003/0139559 A1 | 7/2003 | Okuhira et al. | |
| 2004/0106766 A1 | 6/2004 | Okuhira et al. | |
| 2004/0192873 A1 | 9/2004 | Okuhira et al. | |
| 2011/0198030 A1 * | 8/2011 | Burckhardt ........ | C08G 18/4812 156/331.7 |
| 2015/0203657 A1 * | 7/2015 | Gredegard ........... | C08K 5/1535 560/81 |
| 2015/0344614 A1 * | 12/2015 | Sanz ................. | C08G 18/755 525/457 |
| 2016/0222188 A1 | 8/2016 | Bardin et al. | |
| 2017/0096543 A1 | 4/2017 | Magnusson et al. | |

FOREIGN PATENT DOCUMENTS

| | | |
|---|---|---|
| EP | 0890594 A1 | 1/1999 |
| FR | 3010409 A1 | 3/2015 |
| WO | 2012/026861 A1 | 3/2012 |
| WO | WO-2017014192 A1 * | 1/2017 ............. C08G 18/10 |

OTHER PUBLICATIONS

International Search Report dated May 14, 2018 issued in corresponding PCT/FR2018/050585 application (2 pages).

* cited by examiner

*Primary Examiner* — Eli D. Strah
(74) *Attorney, Agent, or Firm* — Millen, White, Zelano and Branigan, P.C.; Harry B. Shubin

(57) ABSTRACT

Adhesive sealant composition comprising at least one moisture-crosslinkable prepolymer and, as plasticizing agent, an ester compound of formula (I):

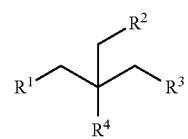

(I)

in which:
R¹, R² and R³ represent an oxycarbonylalkyl radical of 4 to 20 carbon atoms;
R⁴ represents a hydrogen atom, a methyl or ethyl radical or else a radical: —CH₂—R⁵ in which R⁵ represents an oxycarbonylalkyl radical of 4 to 20 carbon atoms.

7 Claims, No Drawings

PHTHALATE-FREE PLASTICIZED ADHESIVE SEALANT COMPOSITION

A subject-matter of the present invention is an adhesive sealant composition comprising a plasticizer, which is advantageously devoid of phthalate, and also a ready-for-use article containing it.

Sealants are widely used in the construction field. They are used to assemble substrates, for example made of concrete or steel, via expansion joints and to make it possible, by virtue of their mechanical and in particular elastic properties, to obtain a joint which is stable to the dimensional variations brought about by changes in temperature. They are also used for the adhesive bonding of floor coverings, in particular wooden floors.

Generally packaged, for the purpose of manual use, in cartridges provided with a nozzle at one end, single-component sealants are applied after having placed the said cartridge in a gun. The handling by the operator of the trigger of the gun actuates a piston which extrudes the sealant through the nozzle and introduces it into the gap between the two substrates to be assembled, for the purpose of joining them together.

Single-component sealant compositions comprise a moisture-crosslinkable prepolymer, the chemical structure of which has, generally terminal, isocyanate or alkoxysilane reactive groups. The reaction of these reactive groups with the water originating from the moisture of the air or of the substrate (known as crosslinking reaction) makes possible, after the introduction of the sealant into the gap between the two substrates to be assembled, the creation of a solid three-dimensional polymeric network which confers the desired mechanical properties on the adhesive joint thus created. These mechanical properties are effectively obtained when all of the amount of sealant introduced is crosslinked, which may require several days.

In the case of two-component sealants, a first composition, analogous to that of a single-component sealant, is combined with a second composition which comprises a crosslinking agent, for example of amine type. The two compositions are mixed at the time of the application by a suitable device, and also extruded by the operator through a nozzle into the gap between the two substrates to be assembled.

The sealant compositions also comprise a plasticizing agent for the purpose of increasing the plasticity of the composition and of decreasing its viscosity, thus making it possible, at the time of the application of the sealant packaged in a cartridge, for it to easily flow by extrusion at the nozzle. The plasticizer also makes it possible, during the application, to improve the ability of the sealant to spread out or to wet the surface of the substrates to be joined together.

Esters of phthalic acid (or phthalates) are commonly used for this purpose. Thus, U.S. Pat. No. 6,548,593 mentions, as reference (cf. Table 2), a single-component sealant based on a moisture-crosslinkable prepolymer comprising, as plasticizer, diisodecyl phthalate (also known under the abbreviation DIDP).

In point of fact, it is well known that phthalates can be dangerous to man, since some of them have been classified by the European Chemicals Agency as carcinogenic, mutagenic or reprotoxic (CMR) substances. Consequently, it is highly desirable, for the purpose of public health, to limit exposure to phthalates or even to replace them by safer substances, in all the industrial products in which they are used and to which the consumer and/or the manufacturer are liable to be exposed.

Furthermore, the plasticizers employed in sealants can exhibit the disadvantage of migrating (or diffusing) out of the crosslinked sealant, which can have several undesirable consequences at the adhesive joint: an unattractive appearance related to the presence of stains at the surface of the substrates in contact with the said joint, a loss of elasticity which risks bringing about failure in its body (or cohesive failure), or else failure at the interface between the joint and the substrate (adhesive failure).

It is an aim of the present invention to provide an adhesive sealant composition based on a plasticizer, which is devoid of phthalate.

Another aim of the present invention is to provide such a sealant composition which comprises a plasticizer which does not migrate out of the crosslinked sealant.

Another aim of the present invention is to provide such a sealant composition resulting in a crosslinked joint which has mechanical properties of the same level as those obtained from DIDP.

Another aim of the present invention is to provide a sealant composition, in particular a single-component sealant composition, resulting in a crosslinked joint which exhibits improved mechanical properties with respect to those obtained from DIDP, in particular in terms of elasticity.

It has now been found that these aims can be achieved, in all or in part, by means of the adhesive sealant composition as defined below.

The present invention thus relates, firstly, to an adhesive sealant composition comprising at least one moisture-crosslinkable prepolymer and, as plasticizing agent, an ester compound of formula (I):

in which:
$R^1$, $R^2$ and $R^3$, which are identical or different, each represent an oxycarbonylalkyl (in other words: —O—C(O)-alkyl) radical having from 4 to 20 carbon atoms;
$R^4$ represents a hydrogen atom, a methyl or ethyl radical or else a radical: —$CH_2$—$R^5$ in which $R^5$ represents an oxycarbonylalkyl radical having from 4 to 20 carbon atoms.

It has been found that the ester of formula (I) acts as a plasticizer in the said composition and makes it possible in particular to retain, in comparison with DIDP, the ability of the said sealant to be extruded from the application cartridge, without leading to the disadvantage of the presence of phthalates in the said composition. In addition, the said ester does not give rise to diffusion (or migration) out of the crosslinked sealant and furthermore makes it possible to obtain a crosslinked adhesive joint which exhibits the required mechanical properties and even improved mechanical properties.

The ester of general formula (I) is obtained by reaction of a monocarboxylic acid with a polyol, which is:
pentaerythritol, of formula:

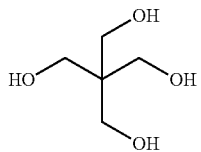

when $R^4$ represents a radical: —$CH_2$—$R^5$;
trimethylolpropane, of formula:

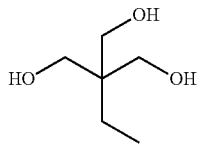

when $R^4$ represents the ethyl radical;
trimethylolethane, of formula:

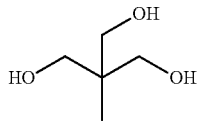

when $R^4$ represents the methyl radical; or else
trimethylolmethane, of formula:

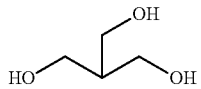

when $R^4$ represents a hydrogen atom.

Butyric acid (also known as n-butanoic acid) or valeric acid (also known as n-pentanoic acid) are preferably employed. Reference is made to Application WO 2012/026861 for fuller details regarding the preparation of the ester of formula (I).

According to a preferred embodiment, the ester compound has the general formula (I), in which $R^4$ represents a radical: —$CH_2$—$R^5$.

According to a more preferred embodiment, the ester has the general formula (I), in which:

$R^1$, $R^2$ and $R^3$ are identical and each represent an oxycarbonylalkyl radical having 4 or 5 carbon atoms; and
$R^4$ represents a radical: —$CH_2$—$R^5$ in which $R^5$ is identical to $R^1$, $R^2$ and $R^3$.

A particularly preferred ester compound is pentaerythritol tetravalerate, corresponding to the formula (I) in which $R^1$, $R^2$, $R^3$ and $R^4$ each represent the radical:

—O—C(O)—(n-$C_4H_9$)

and which is sold under the trade name Pevalen™ by Perstorp.

According to a preferred embodiment of the invention, the adhesive sealant composition comprises from 5% to 35% by weight, preferably from 15% to 30% by weight, on the basis of the weight of the said composition, of the ester of formula (I).

According to a particularly preferred alternative form, the adhesive sealant composition is a single-component sealant composition.

The moisture-crosslinkable prepolymer included in the adhesive sealant composition according to the invention is chosen from:
(i) a polyurethane comprising —NCO end groups, or
(ii) a prepolymer comprising alkoxysilyl end groups.

The polyurethanes comprising —NCO end groups are prepared, in a well-known way, by reacting:
a diisocyanate compound, for example chosen from diphenylmethane diisocyanate (MDI), toluene diisocyanate (TDI), isophorone diisocyanate (IPDI), xylylene diisocyanate (XDI) or hexamethylene diisocyanate (HDI), with
a polyol or composition of polyols having a number-average molar mass ranging from 1000 to 18,000 g/mol, preferably one or more polyethers, and more preferably at least one polyether triol.

The polyurethane prepolymers having —NCO end groups react during the crosslinking reaction with the moisture, forming bonds of urea type which ensure the creation of a solid three-dimensional polymeric network constituting the adhesive joint.

The prepolymers comprising alkoxysilyl end groups comprise at least two alkoxysilyl end groups of formula (III):

$$—Si(R^6)_p(OR^7)_{3-p} \quad (III)$$

in which:
$R^6$ and $R^7$, which are identical or different, each represent a linear or branched alkyl radical comprising from 1 to 4 carbon atoms, with the possibility, when there are several $R^6$ (or $R^7$) radicals, that the latter are identical or different;
p is an integer equal to 0, 1 or 2.

Mention may be made, as example of such alkoxysilyl groups, of the groups:

—Si($CH_3$)(O$CH_3$)$_2$;—Si(O$CH_3$)$_3$;
—Si($CH_3$)(OEt)$_2$;—Si(OEt)$_3$.

The alkoxysilyl end groups are connected, directly or indirectly, to a main chain of polyether, polyester or polyurethane type.

The prepolymers comprising alkoxysilyl end groups react during the crosslinking reaction with the moisture, forming bonds of siloxane type which ensure the creation of a solid three-dimensional polymeric network constituting the adhesive joint.

These prepolymers are also available commercially, for example from Kaneka, Wacker or else Momentive.

According to a preferred alternative form, the moisture-crosslinkable prepolymer is a polyurethane comprising —NCO end groups.

The adhesive sealant composition generally comprises from 10% to 30% by weight, preferably from 15% to 25% by weight, on the basis of the weight of the said composition, of the moisture-crosslinkable prepolymer.

According to one embodiment, the said adhesive sealant composition comprises:
from 10% to 30% by weight of the moisture-crosslinkable prepolymer,
from 5% to 35% by weight of the ester of formula (I) as defined above, as plasticizer,
from 20% to 70% by weight of at least one filler, and from 0.01% to 1% by weight of at least one crosslinking catalyst, the percentages by weight being expressed with respect to the total weight of the adhesive sealant composition.

According to a preferred embodiment, the adhesive sealant composition can comprise, for example, with respect to the total weight of the adhesive sealant composition:

from 15% to 25% by weight of at least one moisture-crosslinkable prepolymer,
from 15% to 30% by weight of the ester of formula (I),
from 40% to 70% by weight of filler, and
from 0.01% to 1% by weight of crosslinking catalyst, the percentages by weight being expressed with respect to the total weight of the adhesive sealant composition.

Filler:

The filler(s) which can be used in the adhesive sealant composition according to the invention can be chosen from inorganic fillers and mixtures of organic fillers and of inorganic fillers.

Use may be made, as example of inorganic filler(s) which can be used, of any inorganic filler(s) usually used in the field of sealant compositions. These fillers are provided in the form of particles of varied geometry. They can, for example, be spherical or fibrous or exhibit an irregular shape.

Preferably, use is made of clay, quartz or carbonate fillers.

More preferably, use is made of carbonate fillers, such as alkali metal or alkaline earth metal carbonates, and more preferably calcium carbonate or chalk.

These fillers can be untreated or treated, for example using an organic acid, such as stearic acid, or a mixture of organic acids predominantly composed of stearic acid.

Use may also be made of hollow inorganic microspheres, such as hollow glass microspheres, and more particularly those made of calcium sodium borosilicate or of aluminosilicate.

The amount of inorganic filler which can be used can in particular vary from 20% to 65% by weight, preferably from 20% to 50% by weight and more preferably from 25% to 40% by weight of the weight of the adhesive sealant composition according to the invention.

Use may be made, as example of organic filler(s) which can be used, of any organic filler(s) and in particular polymeric filler(s) usually used in the field of sealant compositions.

Use may be made, for example, of aramid fibres, such as Kevlar®, polyvinyl chloride (PVC), polyolefins, rubber or ethylene/vinyl acetate (EVA).

Use may also be made of hollow microspheres made of expandable or non-expandable thermoplastic polymer. Mention may in particular be made of hollow microspheres made of vinylidene chloride/acrylonitrile.

Preferably, use is made of PVC.

The mean particle size of the filler(s) which can be used is preferably less than or equal to 10 microns, more preferably less than or equal to 3 microns, in order to prevent them from sedimenting in the adhesive sealant composition according to the invention during its storage.

The mean particle size is measured for a volume particle size distribution corresponding to 50% by volume of the sample of particles analysed. When the particles are spherical, the mean particle size corresponds to the median diameter (D50 or Dv50), which corresponds to the diameter such that 50% of the particles by volume have a smaller size than the said diameter. In the present Patent Application, this value is expressed in micrometres and determined according to Standard NF ISO 13320-1 (1999) by laser scattering on an appliance of Malvern type.

Crosslinking Catalyst

Use may be made, as crosslinking catalyst(s) which can be used in the adhesive sealant composition according to the invention, of any catalyst(s) known to a person skilled in the art for catalysing the crosslinking of the NCO-terminated polyurethane or of the prepolymer comprising alkoxysilyl end groups in the presence of water (or moisture). The water or the moisture may be contributed by the surface of the support or the surrounding environment, in a natural way (atmospheric humidity) or controlled way (for example, in a thermostatically controlled chamber at a relative humidity between 40% and 70% at 23° C., or an oven ranging up to 150° C.) in contact with the composition according to the invention. This crosslinking is reflected by the creation, between the polymeric chains of the polyurethane, of bonds of urea type which result in the formation of a three-dimensional polymeric network.

Use may be made, for example, of one or more crosslinking catalysts chosen from dioctyltin dilaurate (DOTL), bismuth-based catalysts or else tertiary amine catalysts, such as:

1,8-diazabicyclo[5.4.0]undec-7-ene (DBU):

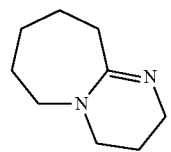 [SMILES: C1CCC2=NCCCN2CC1]

1,5-diazabicyclo[4.3.0]non-5-ene (DBN):

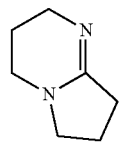

2,2'-dimorpholinodiethyl ether (DMDEE):

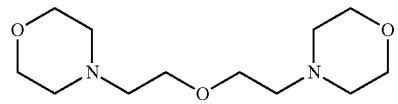 [SMILES: C1CN(CCOCCN2CCOCC2)CCO1]

1,4-diazabicyclo[2.2.2]octane (DABCO):

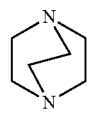

These crosslinking catalysts exhibit the advantage of not being carcinogenic, mutagenic and reprotoxic (CMR).

Preferably, the amount of crosslinking catalyst which can be used ranges from 0.05% to 0.5% by weight, with respect to the weight of the adhesive sealant composition according to the invention.

Anti-Sag Agent:

The adhesive sealant composition according to the invention can also comprise an anti-sag agent, in an amount generally of between 5% and 25% by weight/weight.

Such an agent advantageously makes it possible, when the sealant is used to join together two substrates, the gap of which is located in a vertical plane, to prevent the sagging (also described as creep), under the effect of gravity, of the sealant freshly introduced by the operator and not yet crosslinked at the surface. Such a creep (also denoted by the terms sagging or slump) has to be avoided as it results, after total completion of the crosslinking reaction, in a joint exhibiting a lack of flatness and of dimensional homogeneity seriously harmful to its mechanical properties.

First of all, a solution A of 17.17% weight/weight of n-butylamine in 82.83% weight/weight of DIDP and a solution B of 29.46% weight/weight of 4,4'-MDI in 70.34% weight/weight of DIDP are prepared. The two solutions A and B are heated to 100° C. and then introduced, each under a pressure of 100 bar, into a reactor, in which they are sprayed continuously over one another in a ratio A/B=50.1/49.9 by weight, corresponding to an n-butylamine/MDI molar ratio equal to 2. The reaction is immediate and the temperature of the reactor reaches 140° C. at the end of manufacture.

At the reactor outlet, a stable 23.3% weight/weight dispersion of a bis-urea in DIDP is obtained, the bis-urea being of formula:

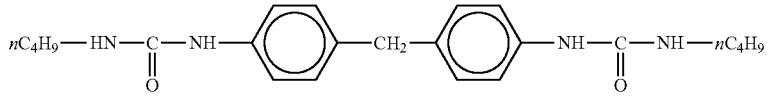

According to a preferred alternative form, the anti-sag agent employed is a thixotropic composition comprising, on the basis of the total weight of the said composition:
 from 10% to 40% by weight of a bis-urea obtained by reaction of a primary aliphatic amine with a diisocyanate with a molar mass of less than 500 g/mol, and
 from 60% to 90% by weight of the ester of formula (I) as defined above.

According to one embodiment, the anti-sag agent employed is a thixotropic composition consisting, on the basis of the total weight of the said composition:
 of 10% to 40% by weight of the said bis-urea, and
 of 60% to 90% by weight of the ester of formula (I).

The use of a bis-urea obtained by reaction of n-butylamine with 4,4'-methylenediphenyl diisocyanate (or 4,4'-MDI) is particularly advantageous.

The adhesive sealant composition according to the invention can also comprise at least one adjuvant chosen from adhesion promoters, such as epoxysilanes, UV stabilizers (or antioxidants), pigments, dyes and their mixture. When these adjuvants are present in the composition, the total sum of their content is preferably less than or equal to 15% by weight, with respect to the total weight of the adhesive sealant composition according to the invention.

The adhesive sealant composition according to the invention is preferably stored in an anhydrous environment, for example in a hermetic packaging where the adhesive sealant composition is sheltered from moisture and preferably sheltered from light.

The present invention also relates to a ready-for-use article or packaging comprising the adhesive sealant composition according to the invention in a hermetic packaging sheltered from air, in particular sheltered from ambient moisture. Preferably, the hermetic packaging also makes it possible to protect the composition from light. For example, the hermetic packaging can be an aluminium bag or an aluminium cartridge provided with a protective cap.

The following examples are given purely by way of illustration of the invention and should not be interpreted in order to limit the scope thereof.

EXAMPLE A REFERENCE thixotropic composition having an anti-sag effect consisting of a 23.3% weight/weight suspension of bis-urea in DIDP The Brookfield viscosity of the suspension, measured at 23° C., is 15 Pa·s.

Example B Reference adhesive sealant composition based on polyurethane prepolymer comprising-NCO end groups comprising, as plasticizer, DIDP and, as anti-sag agent, the thixotropic composition of Example A The following sealant composition, in which the percentages are percentages weight/weight, is prepared by simple mixing of the ingredients:
 17% of polyurethane comprising —NCO end groups obtained by reaction of a mixture of 80% by weight of tolylene 2,4-diisocyanate and 20% by weight of tolylene 2,6-diisocyanate with a mixture of a polyether diol with a molar mass of 2000 g/mol and of a polyether triol with a molar mass of 4200 g/mol,
 25% of carbonate filler,
 20% by weight of PVC,
 15% by weight of the thixotropic composition of Example A,
 10% by weight of DIDP as plasticizer,
 8% by weight of xylene,
 5% by weight of other additives, including the crosslinking catalyst.

The polyurethane was introduced into the composition in the form of a solution in xylene.

The sealant composition obtained is packaged in an aluminium cartridge, provided with a nozzle, for the purpose of its application by means of a gun for the tests described below.

B.1. Test on the Migration of the Plasticizer

This test is a good indicator of the migration of the plasticizer out of the crosslinked sealant.

A weight of 1 g of sealant, in the approximate shape of a sphere, is deposited, by means of the cartridge containing the composition of Example B, at the centre of a $1^{st}$ square glass sheet with a side length of 5 cm, which was placed horizontally beforehand.

A $2^{nd}$ glass sheet identical to the $1^{st}$ is subsequently strongly applied to the said sealant mass and by means of a manual pressure, so as to superimpose the two sheets and to thus spread the sealant in the approximate shape of a disc with a diameter of approximately 4.5 cm.

There is then observed, through the upper glass sheet, the appearance of a transparent liquid exuded by the compressed disc of sealant, in the form of a ring surrounding the said disc, with an annular radius of between 1 and 2 mm.

B.2. Test on the Flow of the Non-Crosslinked Sealant after Extrusion

The aim of this test is to assess the extrudability, through the nozzle, of the cartridge-packaged sealant, under the effect of the pressure exerted by the piston, which is integral with the trigger of the gun actuated by the operator.

With this aim, the sealant is extruded under air pressure through a calibrated nozzle and the weight discharged over one minute is measured.

The sealant to be tested is placed in a cylinder-shaped cup (diameter of 24 mm) terminated by an extrusion nozzle with a diameter of 4 mm and a length of 22.5 mm, and a pressure of 3 bars is exerted on the sealant by means of a suitable appliance, the operation being carried out in a climate-controlled chamber at ambient temperature (23° C.).

The flow rate measured is shown in g/minute in the Table below and corresponds to a perfectly compliant sealant behaviour.

B.3. Test on the Tensile Strength Properties of an Adhesive Joint Formed by the Crosslinked Sealant and Uniting Two Substrates This test is carried out for an adhesive joint uniting two concrete substrates and also for an adhesive joint uniting two aluminium substrates.

The two concrete substrates intended to be joined together are two identical substrates of parallelepipedal shape, having a length of 75 mm, a width of 12 mm and a height of 6 mm, the rectangular face of each substrate intended to be in contact with the joint having a length of 75 mm and a height of 12 mm.

The two aluminium substrates intended to be joined together are two identical substrates of parallelepipedal shape, having a length of 75 mm, a width of 25 mm and a height of 12 mm, the two rectangular faces intended to be in contact with the joint having a length of 75 mm and a height of 12 mm.

B.3.1. Preparation of the Joint Specimens to be Tested

The concrete (or aluminium) joints to be tested are prepared using the sealant of Example B, so that the crosslinked sealant joint which bonds the two substrates is centred on the corresponding rectangular faces, and has a parallelepipedal shape with a length of 50 mm, a width of 12 mm and a height of 12 mm.

The details relating to the shape of the adhesive joint specimens and their preparation are given in European Standard EN 8339 (cf. § 6 and 7). In particular, the sealant of Example 2 is crosslinked by a residence of 28 days in an oven at 23° C. and 50% relative humidity (according to Method A shown in the standard), followed by an alternating cycle of residences in an oven at 70° C. and residences in water at 23° C. (according to Method B shown in the standard).

B.3.2. Tensile Tests on the Joints

The joint specimens prepared according to B.3.1, are drawn in a tensile testing device, the movable jaw of which moves at a constant rate equal to 5.5 mm/minute. The stress applied and the elongation of the test specimen (expressed as %) during the drawing thereof are recorded.

The 100% modulus, corresponding to the stress (in MPa) recorded for an elongation of the joint of 100%, and also the elongation (as %) measured at the breaking of the joint are shown in the table below, for each type of substrate: concrete or aluminium.

B.4. Creep Test

The degree of creep (or sagging or slump) of a sealant employed in a vertical joint is measured according to Standard ASTM D 2202.

An absence of creep of the sealant, i.e. a distance measured on the graduated scale of the appliance of less than 2.5 mm, is observed.

Example C Reference thixotropic composition consisting of a 23.3% weight/weight suspension of bis-urea in pentaerythritol tetravalerate Example A is repeated, the DIDP being replaced with pentaerythritol tetravalerate.

A stable 23.3% weight/weight dispersion of the same bis-urea is obtained, the Brookfield viscosity of which, measured at 23° C., is 16.7 Pa·s.

Example 1

According to the Invention adhesive sealant composition based on polyurethane prepolymer comprising-NCO end groups comprising, as plasticizer, pentaerythritol tetravalerate and, as anti-sag agent, the thixotropic composition of Example C Example B is repeated, replacing, during the preparation of the sealant:
the 10% of DIDP with 10% of pentaerythritol tetravalerate, and
the thixotropic composition of Example A with that of Example C.

The results of the tests are shown in the table below.

|  | Example B | Example 1 |
| --- | --- | --- |
| Migration of the plasticizer Annular radius (in mm) | between 1 and 2 | <0.5 |
| Flow after extrusion (in g/minute) | 69 | 69 |
| 100% modulus (in MPa) concrete substrate | 0.44 | 0.48 |
| Elongation at break (as %) concrete substrate | 480 | 563 |
| 100% modulus (in MPa) aluminium substrate | 0.41 | 0.46 |
| Elongation at break (as %) aluminium substrate | 213 | 387 |
| Creep distance (in mm) according to ASTM D 2202 | <2.5 | <2.5 |

These results reveal, for the sealant of Example 1, a behaviour in the extrusion during the cartridge application which is identical to that of Example B.

The 100% modulus (which indicates the cohesion of the adhesive joint) and the elongation at break (which corresponds to the elasticity of the adhesive joint) are each improved for Example 1 according to the invention in comparison with the reference Example B, both for substrates made of concrete and for substrates made of aluminium.

The invention claimed is:

1. An adhesive sealant composition comprising:
   10% to 30% by weight of at least one moisture-crosslinkable prepolymer which is a polyurethane comprising —NCO end groups,
   5% to 35% by weight of, as a plasticizing agent, an ester compound of formula (I):

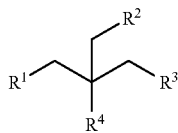 (I)

in which:
   $R^1$, $R^2$ and $R^3$, which are identical and each represent an oxycarbonylalkyl radical of formula —O—C(O)-alkyl having from 4 or 5 carbon atoms;
   $R^4$ represents a radical: —$CH_2$—$R^5$ in which $R^5$ is identical to $R^1$, $R^2$ and $R^3$,
   from 20% to 70% by weight of at least one filler, and
   from 0.01% to 1% by weight of at least one crosslinking catalyst,
   the percentages by weight being expressed with respect to the total weight of the adhesive sealant composition.

2. The adhesive sealant composition according to claim 1, wherein the ester compound of formula (I) is pentaerythritol tetravalerate.

3. The adhesive sealant composition according to claim 1, having from 15% to 30% by weight, on the basis of the weight of the said composition, of the ester of formula (I).

4. The adhesive sealant composition according to claim 1, that is a single-component sealant composition.

5. The adhesive sealant composition according to claim 1, comprising:
   from 15% to 25% by weight of the moisture-crosslinkable prepolymer,
   from 15% to 30% by weight of the ester of formula (I), and
   from 40% to 70% by weight of the filler,
   the percentages by weight being expressed with respect to the total weight of the adhesive sealant composition.

6. Ready-for-use article, comprising the adhesive sealant composition as defined in claim 1 in a hermetic packaging sheltered from air.

7. Article according to claim 6, wherein the packaging is an aluminium cartridge provided with a protective cap.

* * * * *